(12) United States Patent
Grams et al.

(10) Patent No.: US 6,447,236 B1
(45) Date of Patent: Sep. 10, 2002

(54) DOCKING STATION

(75) Inventors: Robert S. Grams, Waukesha; Dean R. Molstad, Sussex, both of WI (US)

(73) Assignee: ABB Automation, Inc., New Berlin, WI (US)

( * ) Notice: Subject to any disclaimer, the term of this patent is extended or adjusted under 35 U.S.C. 154(b) by 0 days.

(21) Appl. No.: 09/525,933

(22) Filed: Mar. 14, 2000

Related U.S. Application Data

(60) Provisional application No. 60/124,427, filed on Mar. 15, 1999.

(51) Int. Cl.⁷ .......................... B65G 67/00; B65G 1/18; G08G 1/01
(52) U.S. Cl. .................. 414/401; 53/505; 209/900; 340/932.2; 340/933; 414/265; 414/799; 414/809; 700/217
(58) Field of Search ................................ 209/587, 900; 414/265, 396, 401, 402, 416.05, 809, 811, 928, 929, 799; 340/431, 932.2, 933, 958; 53/249, 505, 506; 700/215, 217, 218, 225; 198/340, 345.3

(56) References Cited

U.S. PATENT DOCUMENTS

| | | | |
|---|---|---|---|
| 1,244,856 A | | 10/1917 | Jennings |
| 1,438,162 A | | 12/1922 | Hoffman |
| 3,341,037 A | * | 9/1967 | Guilbert, Jr. ............... 414/401 |
| 3,854,889 A | * | 12/1974 | Lemelson .............. 198/341.05 |
| 4,051,957 A | | 10/1977 | Parups |
| 4,277,218 A | * | 7/1981 | Schweichler .................. 296/20 |
| 4,287,459 A | * | 9/1981 | Dahlstrom ................... 700/217 |
| 4,662,810 A | * | 5/1987 | Nobuhara ..................... 414/401 |
| 4,692,876 A | * | 9/1987 | Tenma et al. ................. 414/799 |
| 4,911,608 A | | 3/1990 | Krappitz et al. |
| 4,936,735 A | | 6/1990 | Ryan |
| 5,084,829 A | * | 1/1992 | Kato .......................... 700/217 |
| 5,203,666 A | | 4/1993 | Mojden et al. |
| 5,293,983 A | | 3/1994 | Grapes et al. |
| 5,399,531 A | | 3/1995 | Wu |
| 5,415,518 A | | 5/1995 | Montgomery |
| 5,882,174 A | | 3/1999 | Woerner et al. |
| 5,944,479 A | * | 8/1999 | Kanaya et al. ............... 198/431 |
| 5,971,691 A | | 10/1999 | Munson, Jr. et al. |
| 5,996,735 A | | 12/1999 | Perritt et al. |
| 6,055,462 A | * | 4/2000 | Sato ........................... 700/217 |
| 6,125,306 A | * | 9/2000 | Shimada et al. ............. 700/217 |
| 6,186,738 B1 | * | 2/2001 | Junker ......................... 414/401 |

OTHER PUBLICATIONS

C & D Robotics, Palletizing system: a bright idea, Modern Materials Handeling, Dec. 1994, 2 pages, Cahners Publishing Company,.

C & D Robotics, Robots Lend Muscle To Palletizing, Managing automation 2, Jun. 1992, 2 pages, Thomas Publication.

C & D Robotics, Robotic Palletizers Tie 10 Lines Together, Jan. 1993, 4 pages, Cahners Publishing Company.

Alvey, Gantry Palletizer can span several conveyors, pallets, or workcells, Industrial Equipment News, Mar. 1993, 1 page, Thomas Publishing Company.

Advanced Technology and Research Corporation (ATR) , Real Time Control Engineering Automation, 1997, 8 pages.

* cited by examiner

*Primary Examiner*—Michael R. Mansen
(74) *Attorney, Agent, or Firm*—Michael Best & Friedrich, LLP

(57) ABSTRACT

A docking station for a robotic mail tray loading system includes a ground plate that is mounted to the floor of the building in which the robotic mail tray loading system is housed. The ground plate has first and second wheel-retaining recesses that preferably include ramped surfaces to accommodate wheels of mail carts. A plurality of guide plates are positioned to locate one pallet or two mail carts in the docking station at a time. The docking station also includes a plurality of sensors that sense the presence or absence of a pallet or cart in the docking station and that sense the type of cart present at the cart docking station.

34 Claims, 5 Drawing Sheets

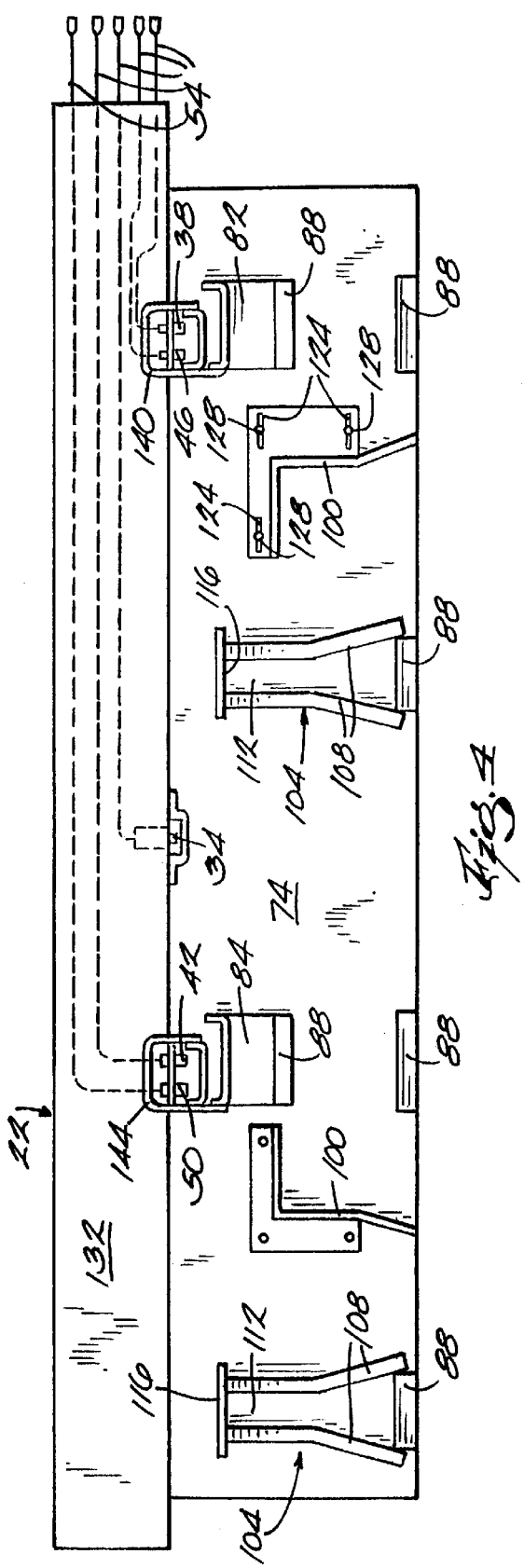

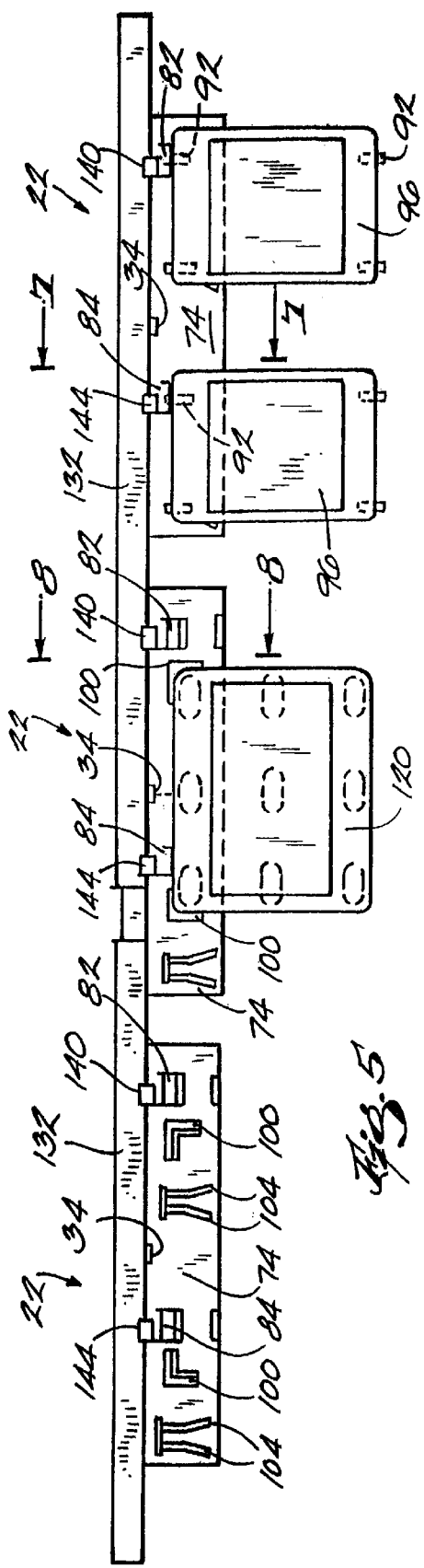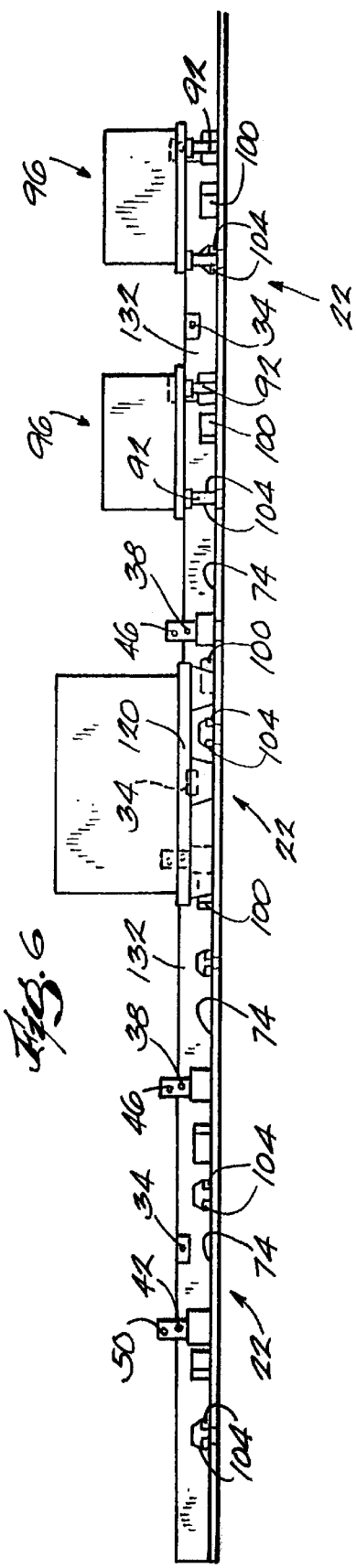

DOCKING STATION

This application claims the benefit of U.S. Provisional Application No. 60/124,427 filed Mar. 15, 1999.

FIELD OF THE INVENTION

The present invention relates to systems and devices used to load containers and pallets. More particularly, the present invention relates to a docking station used to position and detect the presence of carts and pallets that are loaded with objects of interest by a robotic system.

BACKGROUND OF THE INVENTION

Robotic systems are used to accomplish a wide variety of tasks. Recently, robotic systems have been designed to load mail trays and tubs of different shapes and sizes on pallets and into wheeled containers and carts. Often, the process of loading articles into carts and onto pallets is generically referred to as "containerization." In broad terms, the process involves grouping many loose items into "containers" so that the items may be shipped to desired destinations.

To successfully accomplish containerization, it is best if the location and type of container is known or may be readily determined by the robotic system. Knowing the location of the container is important because the location is used by the robotic system to determine where to place articles it is handling. Knowing the type of container is important because such information is generally used by the robotic system to determine how to place articles on or in the container.

In the past, simple sensors have been used to detect the absence or presence of carts at a "drop-off" location. In addition, some robotic systems have used mechanical guides to help position carts at exact locations. However, a docking station having both mechanical and sensor capability to position and detect multiple types of containers (e.g., carts and containers) has not been developed.

SUMMARY

The invention provides a docking station for a robotic mail tray loading system. The docking station includes a ground plate that is mounted to the floor of the building in which the robotic mail tray loading system is housed. The ground plate has first and second wheel-retaining recesses that preferably include ramped surfaces to accommodate wheels of mail carts. Welded or otherwise mounted to the ground plate is a plurality of guide plates. Preferably, the guide plates are positioned to locate one pallet or two mail carts in the docking station at a time.

The docking station also includes a plurality of sensors. Preferably, the docking station includes a pallet sensor that senses the presence or absence of a pallet in the docking station. The docking station also preferably includes first and second cart presence sensors which determine the presence or absence of first and second mail carts, respectively, in the docking station. The docking station also preferably includes first and second cart type sensors paired with the first and second cart presence sensors, respectively, to determine the type of the first and second carts, respectively.

Other features and advantages of the invention will become apparent to those skilled in the art upon review of the following detailed description, claims, and drawings.

BRIEF DESCRIPTION OF THE DRAWINGS

FIG. 4 is a top view of the docking station of FIG. 3.

FIG. 5 is a top view of a plurality of docking stations embodying the present invention.

FIG. 6 is a side view of the docking stations of FIG. 5.

FIG. 7 is an enlarged cross-sectional view taken along line 7—7 in FIG. 5.

FIG. 8 is an enlarged cross-sectional view taken along line 8—8 in FIG. 5.

Figure 1:
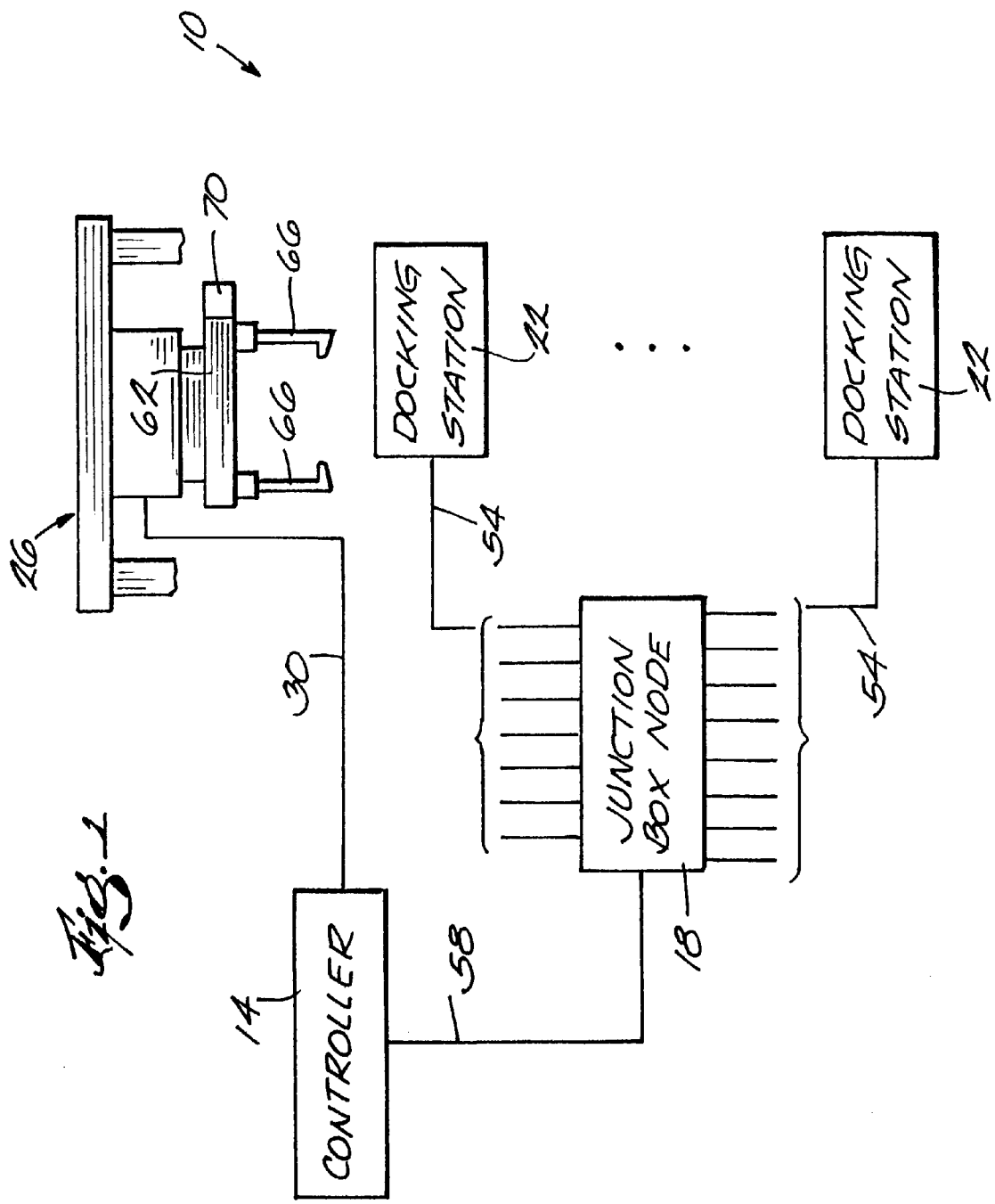
FIG. 1 is a simplified schematic view of a robotic mail tray loading system including a plurality of docking station sensors embodying the present invention.

Before embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

Figure 2:
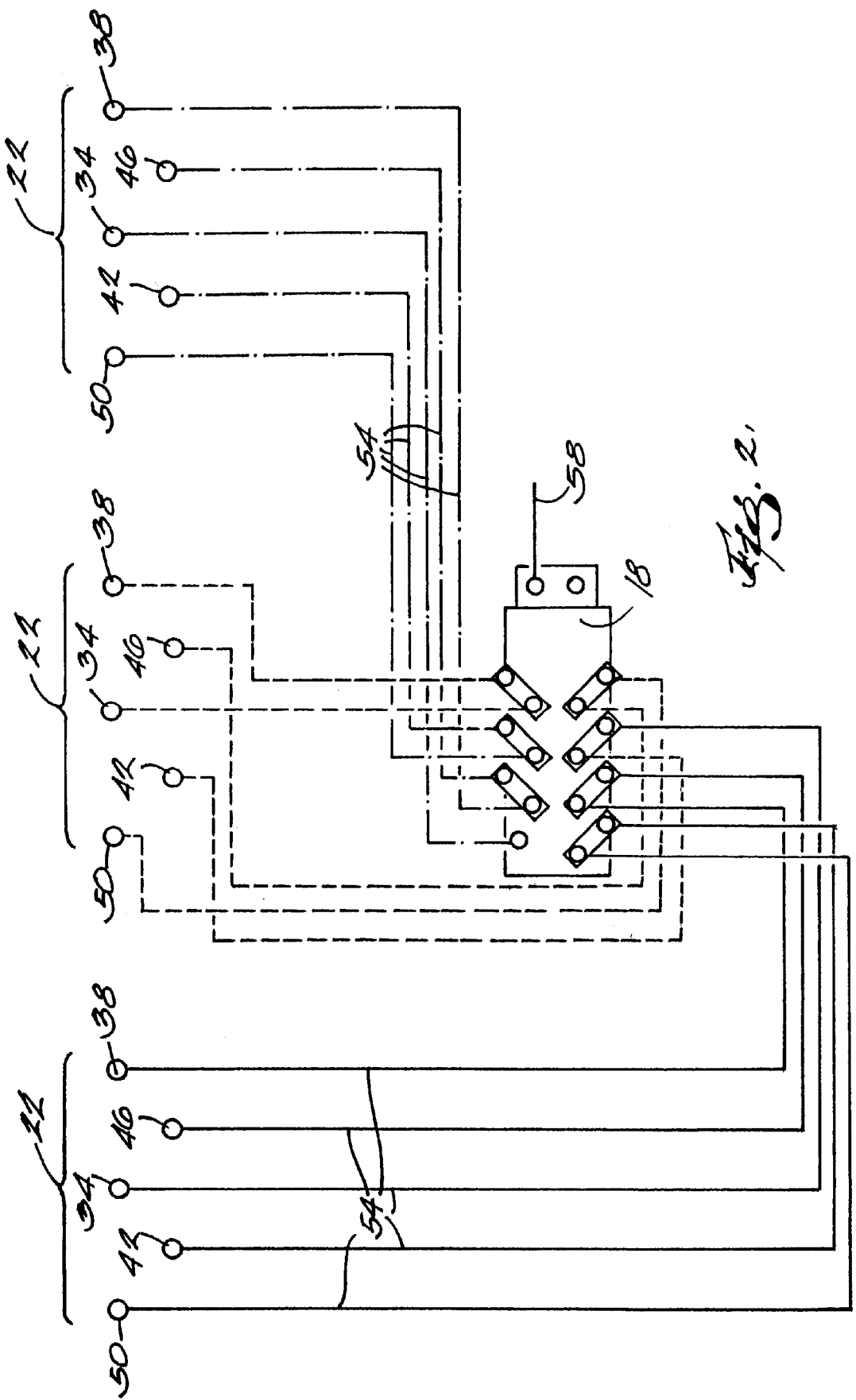
FIG. 2 is a schematic view of the junction box and docking station sensors of FIG. 1.

FIGS. 1 and 2 illustrate a robotic system 10 used to load mail tubs and trays (generically referred to herein as "trays") on pallets and wheeled mail carts (pallets and carts collectively referred to herein as "containers"). As is schematically shown, the system 10 includes a controller 14, a junction box 18, a plurality of docking station sensors 22, and a robot 26. The controller 14 is wired through an electrical, fiber optic, or other suitable conduit 30 to the robot 26, and controls the operation thereof. With particular reference to FIG. 2, each docking station 31 includes a pallet sensor 34, first and second cart presence sensors 38, 42, and first and second cart type sensors 46, 50. (Generically, the cart presence and cart type sensors are referred to as "detection sensors.") Each sensor 34, 38, 42, 46, 50 is wired to the junction box 18 with an electrical, fiber optic, or other suitable communication cable or conduit 54. The controller 14 is also wired to the junction box 18 through an electrical, fiber optic, or other suitable communication cable or conduit 58 to receive information from the sensors 34, 38, 42, 46, 50 of one of the docking stations 31 to facilitate control of the robot 26.

The robot 26 includes an end effector 62 having depending fingers 66 for selectively lifting trays from a conveyor and depositing the trays on containers at the docking stations 31. In this manner, trays having mail for a particular geographic region or ZIP code are loaded on the same container to facilitate delivery of the mail. The end effector 62 includes an end effector sensor 70, the significance of which is described below.

Figure 3:
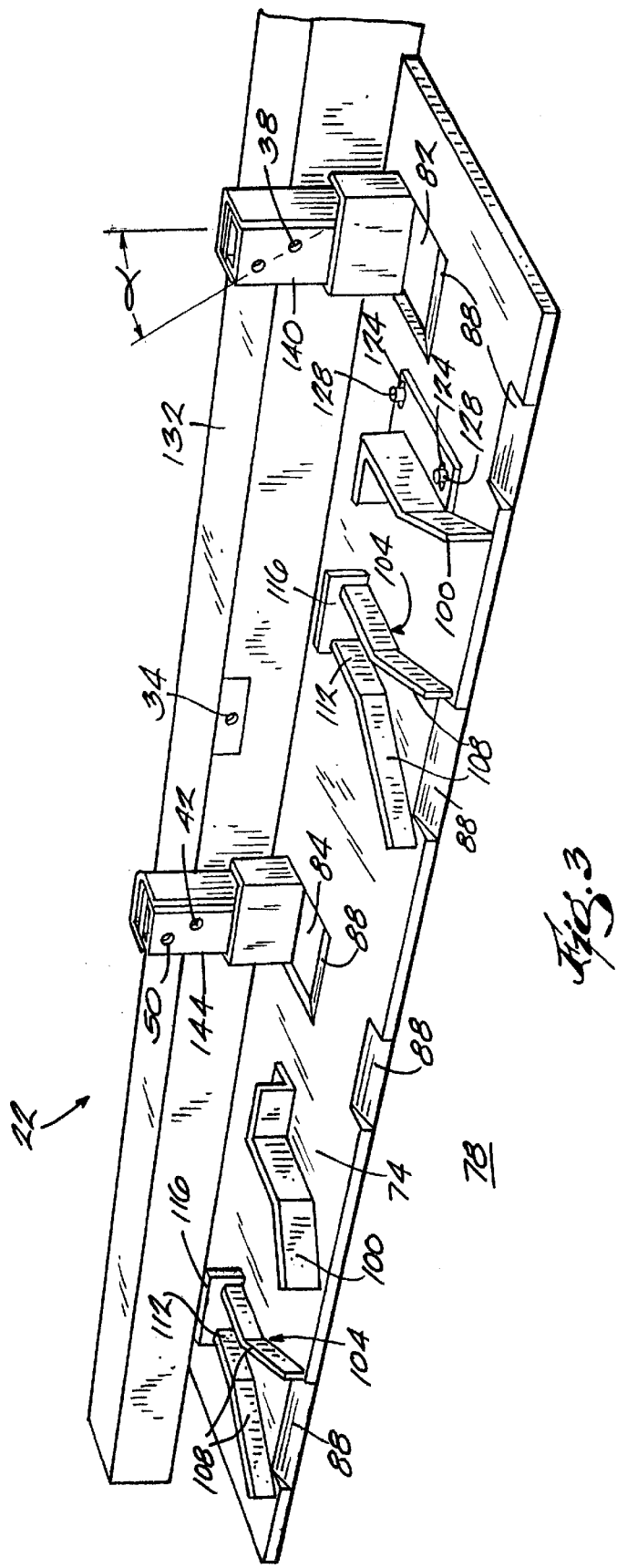
FIG. 3 is a perspective view a docking station embodying the invention.

FIG. 3 illustrates one of the docking stations 31. The cart docking station 31 has a plurality of fixtures for positioning containers at predetermined locations. In particular, the docking station 31 includes a weldment plate, ground plate, or support surface 74 mounted to the floor 78 of the building in which the system 10 is housed. First and second wheel-retaining cut-outs, wells, or recesses 82, 84 are formed in the ground plate 74. Wheel ramps 88 are formed in the ground plate 74 at its edge and within the wheel-retaining recesses 82, 84 to permit the wheels 92 of wheeled carts 96 (FIGS. 5–7) to roll onto the ground plate 74 and into the wheel-retaining recesses 82, 84. The wheel-retaining recesses 82, 84 resist unwanted removal of mail carts 96 from the docking station 31. The docking station 31 also includes pallet guide plates or members 100 and cart guide plates or members 104 welded or otherwise affixed to the ground plate 74. Referring to FIGS. 3 and 4, the cart guide plates 104 form a chute or V-shaped receiving portion 108 that receives a mail cart wheel 92, a channel portion 112 into which the V-shaped receiving portion 108 centers the cart wheel 92, and an end plate or stopper 116 to stop the cart 96 from advancing too far.

The pallet guide plates 100 flare away from each other to facilitate receiving a pallet 120 (FIGS. 5 and 6) therebetween. The pallet guide plates 100 are substantially L-shaped to provide an abutment wall for the pallets 120 so that the pallets do not advance too far into the docking station 31. At least one of the pallet guide plates 100 is adjustable by means of slots 124 that receive studs 128 affixed to the ground plate 74. The adjustable pallet guide plate 100 may be slid within the range provided by the slots 124. When the desired position is attained, nuts are tightened down on the studs 128 to hold the pallet guide plate 100 in place.

With reference to FIGS. 4, 7, and 8, the docketing station 31 also includes a conduit cover or guard 132 having an interior portion 133 along which the sensor conduits 54 run. Straps or harnesses 136, preferably including Velcro hook-and-loop fasteners, are mounted on the conduit guard 132 to bundle the conduits 54 together, and to keep them above the floor 78 and clear of the cart wheels 92, pallets 120, and any workers or vehicles in or near the docking stations 31.

As best shown in FIGS. 3 and 4, the pallet sensor 34 is mounted on the conduit guard 132. A first sensor bracket or post 140 supports the first cart presence sensor 38 and first cart type sensor 46. A second sensor bracket or post 144 supports the second cart presence sensor 42 and second cart type sensor 50. The first and second cart presence sensors 38, 42 are disposed below and at an angle γ with respect to the first and second cart type sensors 46, 50, respectively. The angle γ is preferably between about 20° and 40°, to properly position the cart type sensors 46, 50 as discussed below.

Referring now to FIGS. 5 and 6, a single pallet 120 may be received between the pallet guide members 100 of a docking station 31. Alternatively, a pair of carts 96 may be positioned in the docking station 31. The carts 96 ride high enough on their wheels 92 to straddle the pallet guide members 100. The pallets 120 also have clearance so that they straddle a pair of the cart guide members 104.

When a pallet 120 is in the docking station 31, the pallet sensor 34 is blocked by the pallet 120, and informs the controller 14 of the presence of the pallet 120. The controller 14 causes the robot 26 to load the pallet 120 with trays in response to the information provided by the pallet sensor 34. The pallet 120 does not block any of the cart sensors 38, 42, 46, 50. In this regard, the pallet sensor 34 may be considered both a container presence sensor and a container type sensor, because the pallet sensor 34 informs the controller 14 that a container is present in the docking station 31, and that the container is a pallet 120.

The cart guide members 104 are positioned in the docking station 31 such that when one wheel 92 of the cart 96 is within the channel 112, another wheel 92 of the cart 96 is within the wheel-retaining recess 82 or 84. The respective first and second cart presence sensors 38, 42 determine whether a cart 96 is positioned in front of it, and relay this information to the controller 14. The respective first and second cart type sensors 46, 50 determine what type of cart 96 is present in the docking station 31 based on a characteristic of the mail cart 96. For example, Eastern Regional Mail Carts ("ERMC") are different from General Purpose Mail Carts ("GPMC"), in that ERMC's include a plate not present in GPMC's. The cart type sensors 46, 50 are positioned to identify the presence or absence of the plate and therefore tell the controller 14 the cart type. The controller 14 loads the carts 96 in different manners based on the information provided by the cart type sensors 46, 50. As a backup, the end effector sensor 70 confirms the presence of the cart 96 before depositing a tray therein.

As can be seen from the above, the present invention provides a cart docking station that positions and detects containers used in a robotic system. Many possible forms of the invention may be constructed based on the teachings set forth herein. Therefore, while the present invention has been described in reference to particular embodiments and examples, it should be understood that the invention is not confined to the particular construction and arrangement of the components illustrated and described, but embraces all forms encompassed by the following claims.

What is claimed is:

1. A docking station for receiving various types of containers to be loaded with trays, said docking station comprising:
   a support surface having wheel-retaining recesses adapted to receive the wheels of a container and resist movement of the container away from said docking station;
   a plurality of guide members mounted to said support surface and adapted to guide the wheels of a container into said wheel-retaining recesses;
   a container presence sensor adapted to identify the presence of a container positioned within the docking station; and
   a container type sensor adapted to identify the type of container positioned within the docking station.

2. The docking station of claim 1, wherein said container type sensor is positioned to sense whether the container is one of a first mail cart and a second mail cart.

3. The docking station of claim 1, wherein said plurality of guide members includes first and second angled guide members adapted to locate a wheel of the container.

4. The docking station of claim 1, wherein said support surface is a ground plate, and wherein said wheel-retaining recesses are cut-outs in said ground plate, each of said cut-outs including a ramped surface to facilitate rolling a wheel into said cut-out.

5. The docking station of claim 1, wherein said container presence sensor and said container type sensor are aligned along a line angled between about 20° and about 40° with respect to vertical.

6. The docking station of claim 1, further comprising a pallet sensor adapted to determine whether the container positioned within said docking station is a pallet.

7. The docking station of claim 1, further comprising a second container presence sensor and a second container type sensor, said second presence and type sensors adapted to determine the presence and type, respectively, of a second container positioned within said docking station.

8. The docking station of claim 1, further comprising a conduit guard and a plurality of conduits communicating with said presence sensor and said type sensor, said conduit guard including straps for bundling said conduits, said conduits running along said conduit guard.

9. A docking station comprising:
a ground plate having first and second wheel-retaining recesses;
first and second pallet guide members adapted to position a pallet in said docking station at a known location;
a first pair of wheel guide members spaced from said first wheel-retaining recess such that when one wheel of a cart is disposed between said first pair of wheel guide members, another wheel of the cart is disposed within said first wheel retaining recess; and
a second pair of wheel guide members spaced from said second wheel-retaining recess such that when one wheel of a cart is disposed between said second pair of wheel guide members, another wheel of the cart is disposed within said second wheel retaining recess.

10. The docking station of claim 9, further comprising a pallet sensor adapted to sense whether a pallet is disposed within said docking station.

11. The docking station of claim 9, wherein said first pallet guide member includes a slot receiving a stud that is mounted to said ground plate; the distance between said first and second pallet guide members being adjustable by moving said first pallet guide member with respect to said stud within said slot.

12. The docking station of claim 9, further comprising a cart presence sensor adapted to sense the presence of a cart within said docking station; and a cart type sensor adapted to sense the type of cart positioned within said docking station.

13. The docking station of claim 9, wherein said wheel-retaining recesses include ramped surfaces to facilitate moving wheels into and out of said wheel-retaining recesses.

14. A docking station for receiving pallets and carts for loading, said docking station comprising:
a pallet sensor adapted to sense whether a pallet is disposed within said docking station;
a cart presence sensor adapted to sense whether a cart is present within said docking station; and
a cart type sensor adapted to sense the type of cart that is present within said docking station.

15. The docking station of claim 14, wherein said cart presence and cart type sensors are aligned along a line angled between about 20° and about 40° with respect to vertical.

16. The docking station of claim 15, further comprising a second cart presence sensor and a second cart type sensor.

17. A docking station for receiving various types of containers to be loaded with trays, said docking station comprising:
a support surface having at least one wheel-retaining recess adapted to receive at least one wheel of a container and to resist movement of the container away from said docking station;
at least one guide member mounted to said support surface and adapted to guide at least one wheel of a container into said at least one wheel-retaining recess; and
at least one container sensor adapted to sense at least one of the group of the presence of a container positioned within the docking station, the type of container positioned within the docking station, and both the presence and type of a container within the docking station.

18. A robotic system comprising:
a controller;
a robot linked to the controller and having an end effector with a sensor; and
at least one cart docking station, the cart docking station including
a plate with at least one wheel well, and
at least one container sensor operable to be coupled in data communication relation to the controller,
wherein the controller uses information from the end effector sensor, and the at least one container sensor to determine the presence of and type of container in the cart docking station.

19. A cart docking station comprising:
a plate having
at least one pallet bracket,
at least one wheel well, and
a conduit cover positioned adjacent to the plate; and
at least one container sensor coupled to the plate.

20. A cart docking station comprising:
a ground plate having
at least one pallet bracket,
a chute-guided-wheel well, and
an unguided wheel well, adjacent the chute-guided wheel well;
a conduit cover positioned adjacent to the ground plate;
at least one sensor supported by the conduit cover; and
at least one cart detection sensor located adjacent to one of said chute guided or unguided wheel wells.

21. A cart docking station as claimed in claim 20, wherein the ground plate further comprise a second chute guided wheel well and a second unguided wheel well.

22. A cart docking station as claimed in claim 20, wherein the ground plate further comprises a ramp aligned with the unguided wheel well.

23. A cart docking station as claimed in claim 20, wherein the ground plate further comprises a ramp aligned with the chute-guided wheel well.

24. A cart docking station as claimed in claim 20, further comprising a cart detection sensor bracket mounted on the ground plate, and wherein the at least one cart detection sensor is mounted on the cart detection sensor bracket.

25. A cart docking station as claimed in claim 24, further comprising a second cart detection sensor mounted in the cart detection sensor bracket at a position vertically and horizontally displaced from the at least one cart detection sensor.

26. A cart docking station as claimed in claim 20, wherein the ground plate further comprises a second pallet bracket.

27. A cart docking station, the cart docking station comprising:
a ground plate, the ground plate having a first portion with a fixed bracket, a chute-guided wheel well, an unguided wheel well, and at least two container detection sensors, the ground plate also having a second portion with a movable bracket, a chute-guided wheel well, an unguided wheel well, and two container detection sensors, each detection sensor having a communication cable;
a pallet sensor having a communication cable and positioned between the fixed and movable brackets; and
a conduit positioned adjacent the ground plate and having an interior portion through which at least a portion of the each communication cable from each of the container detection sensors and the pallet sensor is routed.

28. A cart docking station as claimed in claim 27, wherein the pallet sensor is mounted on the conduit.

29. A cart docking station as claimed in claim 27, wherein the two container detection sensors in each first and second portion are positioned diagonally from one another.

30. A cart docking station as claimed in claim 27, wherein the conduit includes at least one cable harness for supporting at least one of the communication cables.

31. A cart docking station as claimed in claim 27, wherein the ground plate further comprises a ramp aligned with each unguided wheel well.

32. A cart docking station as claimed in claim 27, wherein the ground plate further comprises a ramp aligned with each chute-guided wheel well.

33. A robotic system comprising:
    a controller;
    a robot linked to the controller and having an end effector with a sensor; and
    at least one cart docking station, the cart docking station including
    a ground plate with a plurality of wheel wells and a plurality of pallet brackets,
    a first type of container sensor positioned between the pallet brackets, the first type of container sensor coupled in data communication relation to the controller, and
    at least one of a second type of container sensor positioned adjacent at least one of the plurality of wheel wells, the at least one of a second type of container sensor coupled in data communication relation to the controller,
    wherein the controller uses information from the end effector sensor, the first type of container sensor, and the second type of container sensor to determine the presence of and type of container in the cart docking station.

34. A method of detecting the presence of a container, the method comprising:
    providing a cart docking station with a plurality of fixtures for positioning containers at predetermined locations;
    aligning a plurality of sensors with the plurality of fixtures; and
    processing the output of the plurality of sensors to determine the type of container present at the cart docking station.

* * * * *